Figure 1:
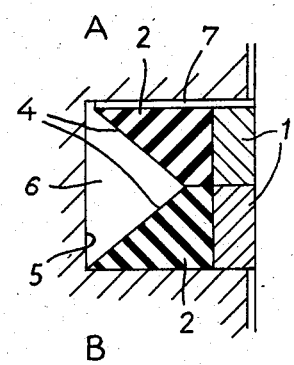

Feb. 16, 1960  J. W. HOWLETT ET AL  2,925,296

SEALING RINGS

Filed July 23, 1956

*Inventors:*
*John William Howlett*
*Kenneth Arthur Blacklock*
By *Holcombe Wetherill & Brisebois*
*Attorneys.*

United States Patent Office 2,925,296
Patented Feb. 16, 1960

2,925,296
SEALING RINGS

John William Howlett and Kenneth Arthur Blacklock, Lymington, England, assignors to Wellworthy Limited, Lymington, England, a British company Application July 23, 1956, Serial No. 599,645

Claims priority, application Great Britain July 22, 1955

7 Claims. (Cl. 288—2)

The present invention relates to sealing rings, and to sealing arrangements incorporating the same, for sealing movable members, such as pistons or plungers movable in cylinders, or reciprocating or rotary shafts movable in a gland or bearing against leakage therepast; and more particularly to improvements or modifications of the invention disclosed in our copending application No. 468,943 filed November 15, 1954.

The aforementioned application discloses a sealing ring comprising a metal ring having a rubber ring bonded on to its internal or external peripheral face, depending upon whether the ring is to be outwardly or inwardly acting, the composite metal and rubber ring being split similar to a conventional piston ring or comprising a plurality of separate ring segments. The rubber ring is shaped or provided with recessed or cut away portions so that when the composite ring is compressed into a ring groove, one or more cavities will be formed into which the rubber can plastically flow as the ring is compressed into the groove.

There is also provided a sealing arrangement comprising two or more sealing rings as above described arranged side-by-side in a ring groove with the ring gaps in the adjacent rings displaced out of alignment and preferably shaped to provide one or more cavities between the adjacent faces of the rubber rings.

When such rings are used in applications, such as hydraulic applications, in which a pressure is built up in the cavity or cavities formed behind the ring or rings due to leakage of fluid through the gap in the ring on the pressure side, it has been found that there is a tendency for this pressure to remain locked in the space formed by the cavity or cavities and thus prevent further relative movement of the piston, shaft or the like incorporating the sealing arrangement.

The present invention seeks to overcome this disadvantage and to this end means are provided for relieving the pressure in the cavity or cavities when the external pressure on the ring is released.

In one form of the invention, one or more small grooves are formed radially across one face of the ring member so that they extend across the composite metal and rubber ring and are arranged to communicate with the cavity or cavities formed behind the rings. Where two or more rings are arranged side-by-side in a ring groove, the ring positioned towards the pressure side of the assembly is provided with the small grooves extending radially across its face remote from the other ring or rings which grooves communicate with the cavity or cavities formed between the adjacent faces of the rubber rings.

Figure 2:
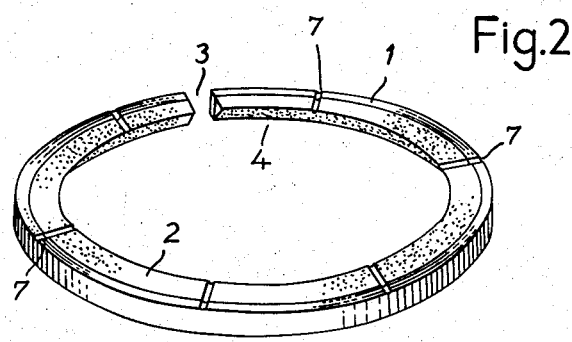
Figure 3:
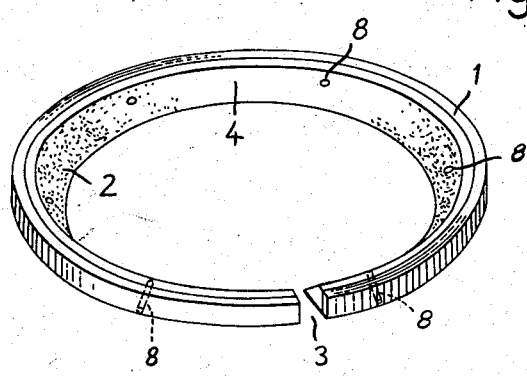

In order that the invention may be more fully understood, reference will now be made to the accompanying drawing, in which:

Fig. 1 shows a section through a ring groove fitted with a sealing arrangement according to the invention, the section being taken through one of the pressure relieving means, Fig. 2 shows a perspective view of one form of sealing ring according to the invention, and Fig. 3 shows a perspective view of another form of sealing ring according to the invention.

Referring to the drawing, each sealing ring is generally constructed in the manner described in our copending application Ser. No. 468,943 filed November 15, 1954 and comprises a metal ring 1 to the internal periphery of which is bonded a ring 2 of natural or synthetic rubber or rubber-like material. The rings are split at 3 in order to allow them to be sprung over a shaft into a groove. The side face of each rubber ring is chamfered towards the bore of the ring as shown at 4. If desired, the ring may be split at more than one point on its circumference.

In order to achieve a good seal, two such rings are assembled side-by-side in the ring groove 5, with their chamfered faces adjacent to one another as shown in Fig. 1, the chamfered faces defining a cavity 6 behind the rings. The combined radial depth of the rubber and metal portions of the composite ring is made slightly greater than the depth of the ring groove so that when the rings are compressed to close the gaps therein, the rubber within the ring groove will also be compressed against the base thereof, the cavity between the two rings providing a space into which the rubber can flow when compressed. The radial compression of the rubber provides the necessary wall pressure between the periphery of the ring and the cylinder against which it moves.

The pair of rings are arranged in the groove with the gaps therein displaced from one another, preferably at diametrically opposite points. Thus, if any oil or other fluid should leak through the gap of the ring which is on the high pressure side of the assembly, indicated at A in Figure 1, this fluid will flow into the cavity 6 between the rings and assist in loading the rings on to the surface against which they bear. The rubber rings will be forced into close contact with the side walls of the ring groove, and furthermore, will be urged to seal over or flow into the gap of the second ring on the low pressure side, indicated at B in Figure 1, thereby resisting or preventing leakage of fluid through the gap in the second ring.

In order to prevent the pressure built up in the cavity 6 from remaining locked in this space when the external pressure is released, and thereby preventing further relative movement of the piston shaft or the like, according to the present invention means are provided for relieving the pressure in the cavity 6, when the external pressure on the ring is released. This pressure relieving means in the embodiment shown in Figures 1 and 2 comprises a plurality of small grooves 7, extending radially across the upper surface of the composite metal and rubber ring and communicating with the chamfered portion 4 which defines the cavity 6 behind the ring. These pressure relieving grooves are provided only in the ring positioned towards the pressure side A of the assembly shown in Fig. 1.

In a modification shown in Fig. 3, the pressure relieving means, instead of comprising grooves, consists of a plurality of small bores 8 through the ring connecting the chamfered portion 4 of the ring, with the external pressure side of the ring.

With the arrangement according to the present invention, when the external fluid pressure on the ring is released, any fluid pressure built-up in the cavity or cavities between the rings can be vented back through the pressure relieving means such as the small grooves 7 or bores 8.

Whilst a particular embodiment has been described it will be understood that various modifications may be made without departing from the scope of this invention.

It will be appreciated that the term "rubber" as used in the specification and claims is intended to include natural rubber and also synthetic rubbers.

We claim:

1. A sealing ring comprising a metal ring having parallel axially extending peripheral faces, a rubber ring bonded to one peripheral face of said metal ring, said rubber ring extending entirely across said face, but not extending axially beyond said face and radially over the metal ring, at least one radially directed split extending through said metal ring and said rubber ring and at least a part of the axially extending surface of said rubber ring being shaped throughout its circumference so that said part has a depth in the axial direction of the ring which is less than the axial depth of the metal ring to form a recess in the axial face of the rubber ring and passage means connecting said recess with an external radial surface of said metal ring.

2. A sealing ring as claimed in claim 1, in which at least one radial groove extends across one surface of said sealing ring between a peripheral edge of said metal ring and said recess.

3. A sealing ring comprising a metal ring having parallel axially extending peripheral faces, a rubber ring bonded on to one peripheral face of said metal ring, said rubber ring extending entirely across said face, but not extending axially beyond said face and radially over the metal, at least one radially directed split extending through said metal ring and said rubber ring and the axially extending surface of said rubber ring being provided with a circumferential chamfer extending across said surface and a plurality of radial grooves extending across the wider radial surface of said sealing ring between a peripheral edge of said metal ring and said chamfer.

4. A sealing ring comprising a metal ring, a rubber ring bonded on to the internal peripheral face of said metal ring, said rubber ring extending entirely across said face, but not extending axially over said face and radially beyond the metal ring, at least one radially directed split extending through said metal ring and said rubber ring and the axially extending inner surface of said rubber ring being provided with a circumferential chamfer extending across at least a portion of said surface so that said surface has a depth in the axial direction of the ring which is less than the axial depth of the metal ring and at least one groove formed radially across one face of said composite metal and rubber ring and connecting said chamfer and a peripheral edge of said metal ring.

5. A sealing arrangement comprising a member having a sealing ring groove formed therein, at least two composite sealing rings disposed side-by-side in said ring groove, each of said sealing rings comprising a metal ring having parallel axially extending peripheral faces, a rubber ring bonded on to the peripheral face of said metal ring which faces the bottom of the groove, said rubber ring extending entirely across said face, but not extending axially beyond said face and radially over the metal ring, at least one radially-directed split extending through said metal ring and said rubber ring and at least a part of each of said rubber rings which faces the bottom of the groove being shaped so that said part of each of said rubber rings has a depth in the axial direction of the ring which is less than the axial depth of the metal ring, said sealing rings being arranged in said groove such that the splits in the rings are displaced out of alignment and so that said shaped parts, with said groove, define a circumferentially-extending cavity behind the rubber rings and passage means provided in that one of said sealing rings which is on the high pressure side of the sealing arrangement, said passage means connecting said cavity with an external surface of said metal ring which is on the high pressure side of the sealing arrangement.

6. A sealing arrangement as claimed in claim 5, having at least one groove extending radially across one end face of one composite metal and rubber sealing ring and connecting said cavity with a peripheral edge of said metal ring.

7. A sealing arrangement comprising a member having a sealing ring groove formed therein, a pair of composite sealing rings disposed side-by-side in said ring groove, each of said sealing rings comprising a metal ring, a rubber ring bonded on to the peripheral face of said metal ring which faces the bottom of the groove, said rubber ring extending entirely across said face, but not extending axially beyond said face and radially beyond the axial bonding line between the metal and rubber rings, at least one radially-directed split extending through said metal ring and said rubber ring and at least a part of each of said rubber rings which faces the bottom of the groove being chamfered, said sealing rings being arranged in said groove such that the splits in the rings are displaced out of alignment and so that said chamfered parts with said groove define a circumferential cavity behind the rubber rings, and a plurality of grooves formed radially across the outer end surface of that one of said rings which is on the high pressure side of the sealing arrangement and connecting said cavity with a peripheral edge of the metal ring.

References Cited in the file of this patent

UNITED STATES PATENTS

| | | |
|---|---|---|
| 2,208,620 | Baisch | July 23, 1940 |
| 2,386,496 | Northup | Oct. 9, 1945 |
| 2,456,529 | Naab | Dec. 14, 1948 |
| 2,486,088 | Yards | Oct. 25, 1949 |
| 2,538,422 | Kollsman | Jan. 16, 1951 |
| 2,709,630 | Patterson | May 31, 1955 |